(12) United States Patent
Breu et al.

(10) Patent No.: US 11,349,402 B2
(45) Date of Patent: May 31, 2022

(54) DC VOLTAGE CONVERTER ARRANGEMENT, FUEL CELL VEHICLE AND METHOD FOR OPERATING A DC VOLTAGE CONVERTER ARRANGEMENT

(71) Applicant: Audi AG, Ingolstadt (DE)

(72) Inventors: Martin Breu, Steinach (DE); Maximilian Schiedermeier, Ingolstadt (DE); Fabian Schulte, Nuremberg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/287,970

(22) PCT Filed: Sep. 20, 2019

(86) PCT No.: PCT/EP2019/075266
§ 371 (c)(1),
(2) Date: Apr. 22, 2021

(87) PCT Pub. No.: WO2020/083580
PCT Pub. Date: Apr. 30, 2020

(65) Prior Publication Data
US 2021/0376743 A1 Dec. 2, 2021

(30) Foreign Application Priority Data
Oct. 23, 2018 (DE) .......................... 102018218091.1

(51) Int. Cl.
*H02M 3/337* (2006.01)
*H02M 3/335* (2006.01)
(Continued)

(52) U.S. Cl.
CPC ......... *H02M 3/33576* (2013.01); *B60L 53/20* (2019.02); *H02M 1/0064* (2021.05); *H02M 3/337* (2013.01)

(58) Field of Classification Search
CPC .............. H02M 3/337; H02M 1/0064; H02M 3/33576; H02M 2001/0058;
(Continued)

(56) References Cited

U.S. PATENT DOCUMENTS 6,980,447 B1   12/2005   Schaible et al.
9,748,865 B2 *  8/2017   Ayai .................. H02M 3/33576
(Continued)

FOREIGN PATENT DOCUMENTS

CN        107154740 A    9/2017
DE   10 2011 087 283 A1  5/2013
(Continued)

OTHER PUBLICATIONS

Prasanna et al,. "Propulsion System Architecture and Power Conditioning Topologies for Fuel Cell Vehicles," *IEEE Transactions on Industry Applications* 51(1): 640-650, Jan./Feb. 2015.

*Primary Examiner* — Adolf D Berhane
(74) *Attorney, Agent, or Firm* — Seed IP Law Group LLP

(57) ABSTRACT

A DC voltage converter arrangement includes a plurality of full switch bridges and transformers and is for a galvanically separate, at least indirect electrical coupling of a fuel cell unit to a traction network including a high-voltage battery. The plurality of full switch bridges and transformers transform a DC input voltage to an alternating voltage, transform the alternating voltage to a transformed alternating voltage, and transform the transformed alternating voltage to a DC output voltage. At least one of the full switch bridges is included in a resonance circuit including an inductance and a capacitor.

10 Claims, 5 Drawing Sheets

(51) Int. Cl.
*B60L 53/20* (2019.01)
*H02M 1/00* (2006.01)

(58) Field of Classification Search
CPC ... H02M 2001/007; H02M 2001/0077; H03M 3/285; B60L 53/20
See application file for complete search history.

(56) References Cited

U.S. PATENT DOCUMENTS

| | | | |
|---|---|---|---|
| 9,876,434 B2* | 1/2018 | Torrico-Bascope | H02M 1/15 |
| 11,165,331 B2* | 11/2021 | Hanson | B64D 41/00 |

FOREIGN PATENT DOCUMENTS

| | | |
|---|---|---|
| DE | 10 2013 207 099 A1 | 10/2014 |
| DE | 10 2014 018 744 A1 | 6/2016 |
| EP | 2 720 366 A2 | 4/2014 |

\* cited by examiner

DC VOLTAGE CONVERTER ARRANGEMENT, FUEL CELL VEHICLE AND METHOD FOR OPERATING A DC VOLTAGE CONVERTER ARRANGEMENT

BACKGROUND

Technical Field

The present disclosure relates to a DC voltage converter arrangement for the galvanically separate, at least indirect electrical coupling of a fuel cell unit to a traction network including a high-voltage battery. The DC voltage converter includes a first electrical terminal pair at the fuel cell side, where a DC input voltage is present or can be applied, the DC input voltage $U_E$ being transformable into an alternating voltage by a first full switch bridge including first switches and by a second full switch bridge including second switches and connected in parallel with the first full switch bridge. The alternating voltage provided by the first full switch bridge is transformable in a given or predeterminable ratio from a first primary side of a first transformer to a first secondary side of the first transformer. The alternating voltage provided by the second full switch bridge is transformable in a given or predeterminable ratio from a second primary side of a second transformer to a second secondary side of the second transformer. The transformed alternating voltage is transformable into a DC output voltage by a third full switch bridge electrically connected to the first secondary side of the first transformer and including third switches, and by a fourth full switch bridge switched in series with the third full switch bridge, electrically connected to the second secondary side of the second transformer, and including fourth switches, this being provided or being able to be provided at a second electrical terminal pair at a battery side. The present disclosure further relates to a method for operating such a DC voltage converter arrangement and a fuel cell vehicle.

Description of the Related Art

ISO 6496-3 (in the version on the priority date of the present application) is related to insulation resistance in the use of a fuel cell stack in an electrically operated vehicle. The insulation resistance is voltage-dependent and accordingly may have higher values for larger voltages in order to protect against insulation faults. The fuel cell stack itself has a relatively low insulation resistance, suitable for a traction network in the range of 350 Volt (V) to 450 V, especially 400 V. More powerful vehicles have an architecture with voltage values significantly above the aforementioned values, so that fuel cell vehicles with a 800 Volt architecture in particular may not fully satisfy ISO 6496-3.

For this reason, the aforementioned DC voltage converter arrangement makes it possible to provide a total of three different voltage levels in order to adapt the voltage of the fuel cell unit to the secondary consumers and to the high-voltage battery. Such a DC voltage converter arrangement is known from DE 10 2014 018 744 A1.

In the known DC voltage converter arrangement, the shortcoming has been discovered that the switches carry the full load current during their switching process, and large switching losses occur when they are switched off. The resistance of the semiconductor increases gradually in the course of the switch-off process, so that the voltage across the switch increases continuously and the current flow through the switch becomes increasingly less. If the switch is closed, the voltage value lies at the level of the input voltage and the current flow comes to a complete halt. The high power loss occurring in this process results in a heavy heating of the switches, designed as semiconductor switches, resulting in decreased efficiency of the voltage conversion. The reduced efficiency furthermore results in a shorter driving range of a fuel cell vehicle.

BRIEF SUMMARY

Embodiments of the present disclosure provide a DC voltage converter arrangement, a fuel cell vehicle and a method for operating a DC voltage converter arrangement that address the above mentioned shortcomings.

In a DC voltage converter arrangement according to the present disclosure at least one of the full switch bridges may be included in a resonance circuit including an inductance and a capacitor.

The oscillatory circuit has the advantage that the load current flows sinusoidally through the switches, being displaced in the positive direction by the amount of the output current. Therefore, only a slight probability exists that the switching process of the switches will occur precisely when the amplitude of the load current is at maximum, so that the switches do not carry the full load current during at least a large number of switching processes and are thus thermally relieved.

In an especially simple layout, which at the same time results in a more compact design of the DC voltage converter arrangement, the first transformer and/or the second transformer is associated with the resonance circuit at the secondary side, and that the resonance circuit is driven by a stray inductance of the first transformer and/or the second transformer which is present at the secondary side.

It has also proven to be especially advantageous for the capacitor and/or the stray inductance to be dimensioned or configured such that a load current flowing through the third switches of the third full switch bridge and/or through the fourth switches of the fourth full switch bridge is reduced, in particular minimized. Thus, by a suitable dimensioning of the resonance circuit, the passing through zero of the sinusoidal load current can be situated at the switching time of the full switch bridges, so that the switches have at least almost no current supplied to them during the switching processes and are thus further thermally relieved.

In the same context, it has therefore proven to be advantageous for the switching times of the switches to be chosen such that they basically correspond to the passing through zero of the substantially sinusoidal load current through the switches.

A further thermal relief for the switches and thus an enhanced efficiency can be achieved in that the first transformer is associated with a first resonance circuit including a first capacitor and driven with a stray inductance at the secondary side, and in that the second transformer is associated with a second resonance circuit including a second capacitor and driven with a stray inductance at the secondary side.

In order to realize multiple voltage levels, and in accordance with ISO 6496-3, it has proven to be advantageous for an output terminal pair of a boost converter electrically connected to the fuel cell unit to be connected to the first electrical terminal pair. It is thus possible to increase the voltage provided by the fuel cell unit by the boost converter in a ratio of 1.2 to 1.5, providing the DC input voltage $U_E$ at the output of the boost converter.

In this regard, it is advantageous for a first DC voltage to be present at the input side of the boost converter and a second DC voltage level to be present at the output side, being higher than the first DC voltage level, the second DC voltage level corresponding to the DC input voltage, and the DC output voltage being further increased beyond the DC input voltage.

A more compact and more highly integrated fuel cell system can be formed in that the DC voltage converter arrangement provides a distributor unit at the output terminal pair of the boost converter, which is electrically connected there. The distributor unit is preferably electrically connected at the output side to at least one secondary consumer of a fuel cell system including the fuel cell unit. Secondary consumers of the fuel cell system may be, for example, coolant pumps, recirculation fans, compressors, and the like.

The benefits and embodiments described in the context of the DC voltage converter arrangement also hold for a fuel cell vehicle according to principles of the present disclosure, which can be equipped for example with a 800 V architecture and thus has a very powerful design.

The benefits described for the DC voltage converter arrangement also hold in the context of a method for operating such an arrangement. The method may include providing a DC input voltage at a first full switch bridge including first switches and at a second full switch bridge switched in parallel with the first full switch bridge and including second switches and transforming the DC input voltage into an alternating voltage by the first full switch bridge and by the second full switch bridge. The method may include providing the alternating voltage at a first primary side of a first transformer and transforming the alternating voltage at a first secondary side of the first transformer in a given or predeterminable ratio, as well as providing the alternating voltage at a second primary side of a second transformer and transforming the alternating voltage at a second secondary side of the second transformer in a given or a predeterminable ratio. The method may include transforming the alternating voltage at the secondary side by a third full switch bridge including third switches and by a fourth full switch bridge switched in series with the third switch bridge and including fourth switches. The method may include operating an electrical resonance circuit including a capacitor by a stray inductance of the first transformer and/or the second transformer that is present on the secondary side, such that a substantially sinusoidal load current flowing through the switches of at least one of the full switch bridges is situated basically at the passing through zero at the switching time.

Thus, an integrated resonance circuit is realized, which utilizes the stray inductance of the first transformer and/or the second transformer to reduce the load current through the switches during the switching process and thus thermally relieve the switches of the full switch bridge.

In this regard, it is advantageous for the fuel cell unit to provide a first DC voltage level which is picked off from a boost converter at the input side, providing a second DC voltage level increased beyond the first DC voltage level at the output side, and for the second DC voltage level to correspond to the DC input voltage.

The features and combinations of features mentioned above in the specification, as well as the features and combinations of features mentioned below in the description of the figures and/or shown solely in the figures, can be used not only in the particular combination indicated, but also in other combinations or standing alone, without leaving the scope of the present disclosure. Hence, configurations not explicitly shown or explained, yet deriving from and created from the explained configurations by separate combinations of features, shall also be deemed to be disclosed and encompassed by the present disclosure.

BRIEF DESCRIPTION OF THE SEVERAL VIEWS OF THE DRAWINGS

Further benefits, features and details of the present disclosure will emerge from the claims, the following description of preferred embodiments, and the drawings. There are shown:

BRIEF DESCRIPTION OF THE SEVERAL VIEWS OF THE DRAWINGS

Figure 4:
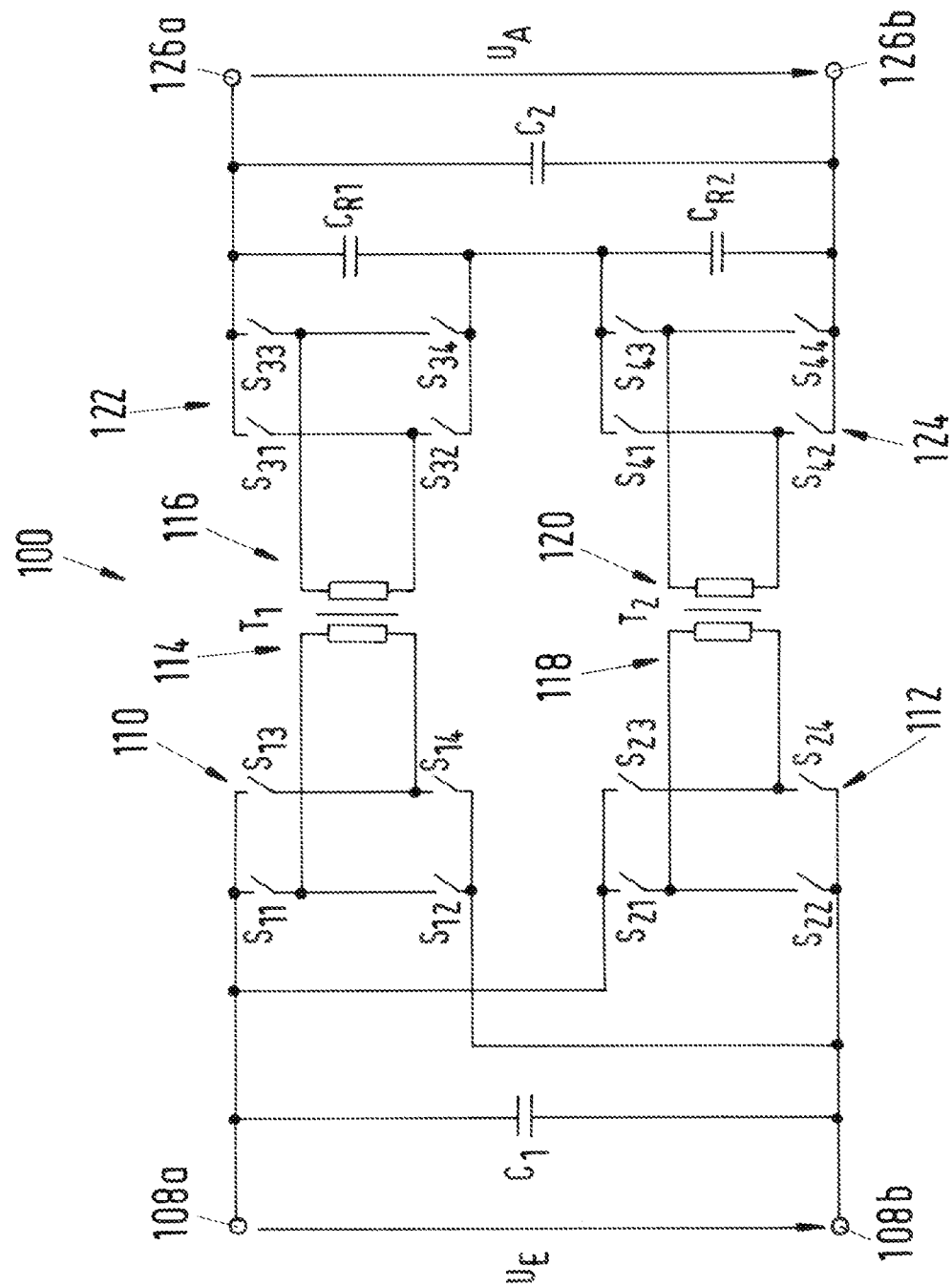
FIG. 4 is an equivalent circuit diagram of a DC voltage converter arrangement from the prior art.

FIG. 4 shows a DC voltage converter arrangement 100 according to the preamble of claim 1. The DC voltage converter arrangement 100 of FIG. 4 is designed to electrically couple a fuel cell unit 102 in galvanically separate and at least indirect manner to a traction network 106 including a high-voltage battery 104.

The DC voltage converter arrangement 100 includes a first electrical terminal pair 108a, 108b at the fuel cell side, where a DC input voltage $U_E$ is present or can be applied. The DC input voltage $U_E$ is transformable into an alternating voltage by a first full switch bridge 110 including first switches $S_{11}, S_{12}, S_{13}, S_{14}$ and by a second full switch bridge 112 including second switches $S_{21}, S_{22}, S_{23}, S_{24}$ connected in parallel with the first full switch bridge 110.

The alternating voltage provided by the first full switch bridge 110 is transformable in a given or predeterminable ratio from a first primary side 114 of a first transformer $T_1$ to a first secondary side 116 of the first transformer $T_1$. The alternating voltage provided by the second full switch bridge 112 is transformable in a given or predeterminable ratio from a second primary side 118 of a second transformer $T_2$ to a second secondary side 120 of the second transformer $T_2$.

The transformed alternating voltage is transformable into a DC output voltage UA by a third full switch bridge 122 electrically connected to the first secondary side 116 of the first transformer $T_1$ and including third switches $S_{31}, S_{32}, S_{33}, S_{34}$ and by a fourth full switch bridge 124 switched in series with the third full switch bridge 122, electrically connected to the second secondary side 120 of the second transformer $T_2$ and including fourth switches $S_{41}$, $S_{42}$, $S_{43}$, $S_{44}$ The DC output voltage UA is provided or able to be provided at a second electrical terminal pair 126a, 126b at a battery side and lies preferably at the voltage level of a high-voltage battery 104, especially a voltage level of a 800V architecture.

Figure 5:
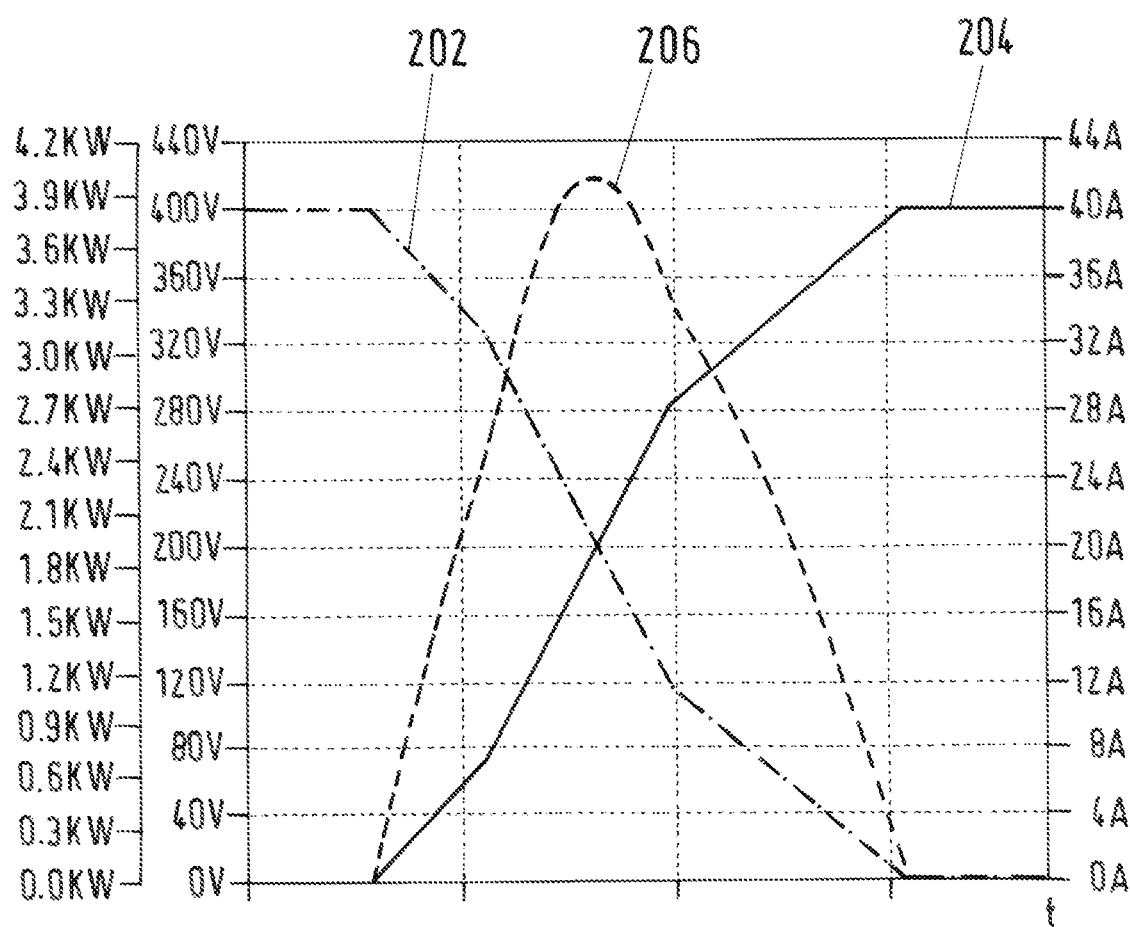
FIG. 5 the current curve, the voltage curve, and the switching losses during the switch-off process of the switches of a full switch bridge of the DC voltage converter arrangement of FIG. 4.

FIG. 5 shows curves of the switch-off process of the third full switch bridge 122 and/or the fourth full switch bridge 124 in the case of the DC voltage converter arrangement 100 of the prior art. It can be seen that, during the course of the switch-off process, the resistance of the semiconductor increases gradually, as can be noticed from the voltage curve 204. Thus, the voltage increases continuously across the switch, and it can be ascertained with the aid of the current curve 202 that the current flow through the particular switch becomes increasingly less. If the particular switch is closed, the voltage value is at the level of the input voltage and the current flow has halted completely. With the help of the power loss curve 206, it can be seen that this has its maximum during half of the switching process, and the large power loss which occurs results in intense heating of the semiconductor switch.

Figure 2:
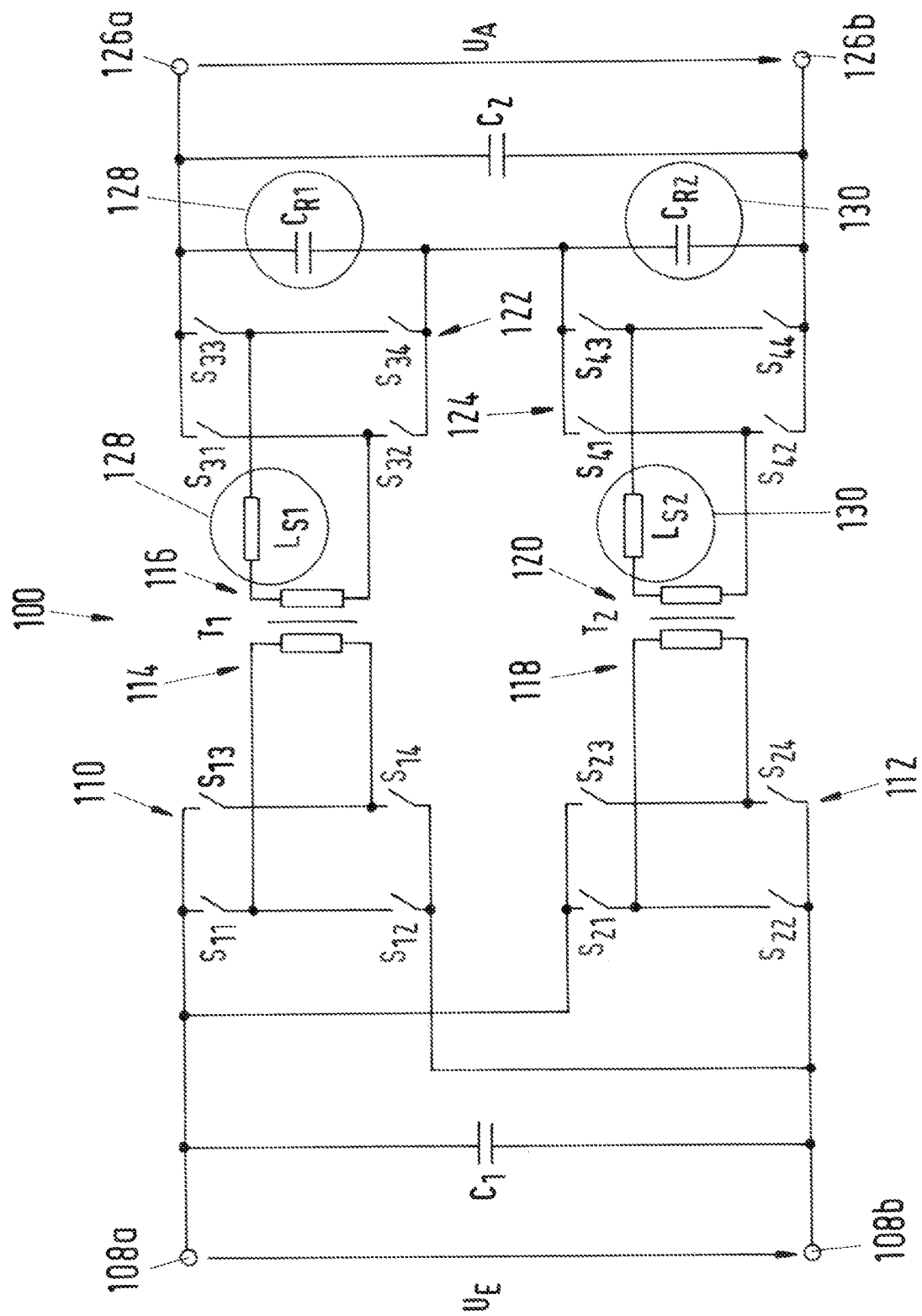
FIG. 2 is an equivalent circuit diagram of a DC voltage converter arrangement for the galvanically separate, at least indirect electrical coupling of a fuel cell unit to a traction network including a high-voltage battery, in accordance with some embodiments.

FIG. 2 is an equivalent circuit diagram of a DC voltage converter arrangement 100 for the galvanically separate, at least indirect electrical coupling of a fuel cell unit to a traction network including a high-voltage battery, in accordance with some embodiments.

It is apparent from FIG. 2 that at least one of the full switch bridges 110, 112, 122, 124 is included in a resonance circuit 128, 130 including an inductance $L_{S1}$, $L_{S2}$ and a capacitor $C_{R1}$, $C_{R2}$.

In the present case, the first transformer $T_1$ is associated with a first resonance circuit 128, which is formed by a stray inductance $L_{S1}$ of the first transformer $T_1$ and a first capacitor $C_{R1}$ present on the secondary side. The second transformer $T_2$ is associated with a second resonance circuit 130, which is formed by a stray inductance $L_{S1}$ of the second transformer $T_2$ and a second capacitor $C_{R2}$ present on the secondary side.

The capacitors $C_{R1}$, $C_{R2}$ and the stray inductances $L_{S1}$, $L_{S2}$ are dimensioned or configured such that a load current flowing through the third switches $S_{31}$, $S_{32}$, $S_{33}$, $S_{34}$ of the third full switch bridge 122 and a load current flowing through the fourth switches $S_{41}$, $S_{42}$, $S_{43}$, $S_{44}$ of the fourth full switch bridge 124 is reduced, in particular, minimized. The switching times of the switches $S_{31}$ $S_{32}$ $S_{33}$ $S_{34}$; $S_{41}$ $S_{42}$ $S_{43}$ $S_{44}$ are chosen such that they basically correspond to the passing through zero of the sinusoidal load current through the switches $S_{31}$, $S_{32}$, $S_{33}$, $S_{34}$; $S_{41}$, $S_{42}$, $S_{43}$, $S_{44}$.

Figure 3:
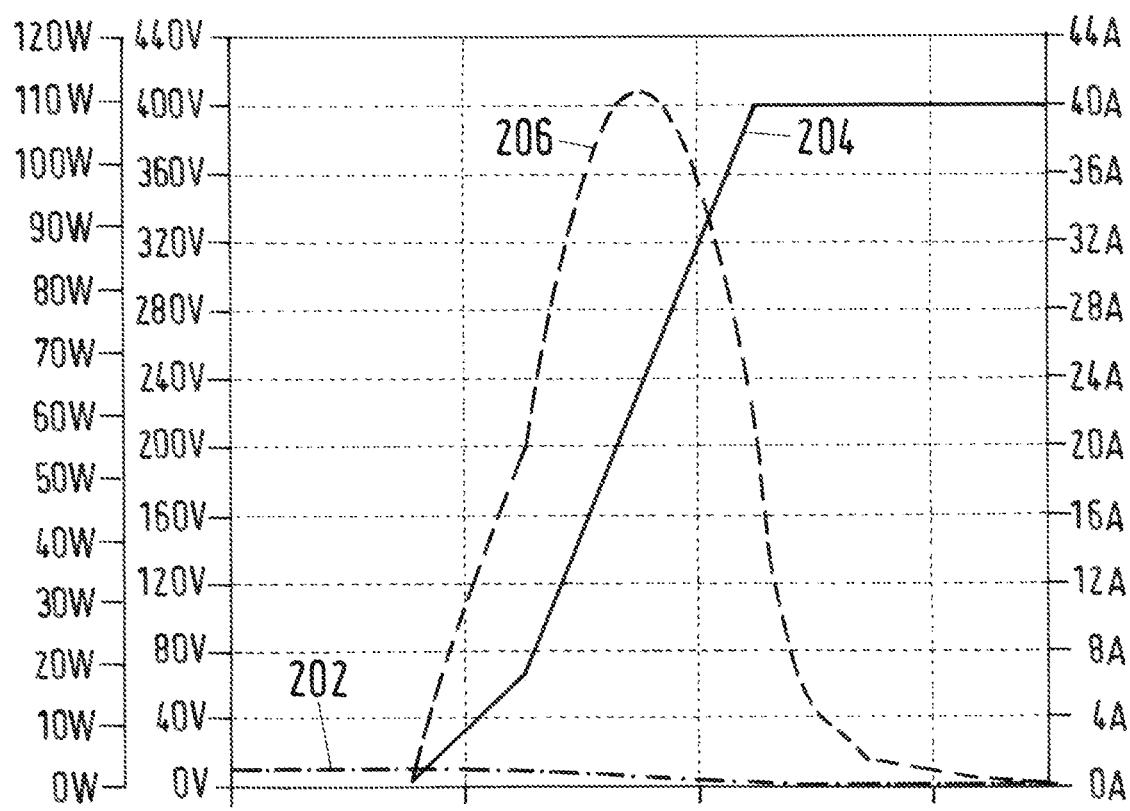
FIG. 3 includes a current curve, a voltage curve, and switching losses during the switch-off process of the switches of a full switch bridge of the DC voltage converter arrangement of FIG. 2, in accordance with some embodiments.

This can be seen from the measurement investigation of a switch-off process in FIG. 3. FIG. 3 illustrates curves associated with a switch-off process, according to some embodiments. The current curve 202 in the switch-off process corresponds almost to zero Amperes and thus the power losses 206 are also much smaller. This results in a thermal relief for the full switch bridges 110, 112, 122, 124.

Figure 1:
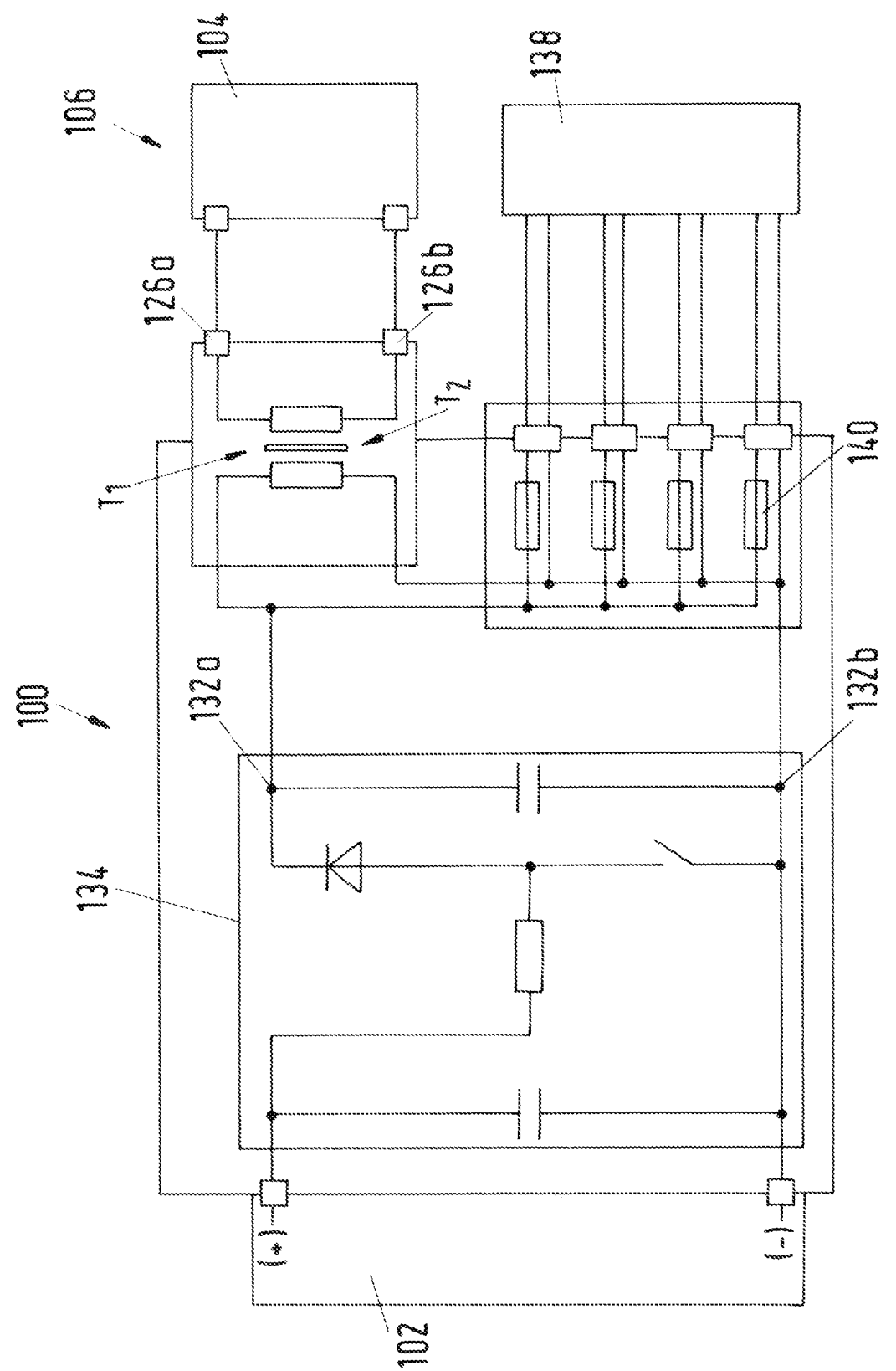
FIG. 1 is a schematic block circuit diagram of a DC voltage converter arrangement for the galvanically separate electrical coupling of a fuel cell unit to a traction network (onboard network), providing a total of three different DC voltage levels, in accordance with some embodiments.

FIG. 1 is a schematic block circuit diagram of a DC voltage converter arrangement 100 for the galvanically separate electrical coupling of a fuel cell unit to a traction network (onboard network), providing a total of three different DC voltage levels, in accordance with some embodiments. With the aid of FIG. 1 it can be seen that a total of three different voltage levels can be provided by the DC voltage converter arrangement 100 when using a boost converter 134. The first voltage level is created by the fuel cell unit 102 and lies in the range of 200V to 300V.

This first DC voltage level is provided at the input side at the boost converter 134 and it raises the voltage to a second DC voltage level, corresponding to the DC input voltage $U_E$. The DC input voltage $U_E$ can then be utilized to supply electricity to secondary consumers 138 of a fuel cell system including the fuel cell unit 102, there being present here in particular a voltage level lying in the range of 350V to 450V. FIG. 1 furthermore shows the possibility of employing fuses 140.

The DC input voltage $U_E$ may also be utilized for the connection of the traction network 106 including the high-voltage battery 104, where a galvanic separation is present in order to address the insulation resistance according to ISO 6496-3. This traction network 106 is operated, for example, at a voltage level of 800V, so that the third voltage level is thus realized.

Aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A DC voltage converter arrangement for the galvanically separate, at least indirect electrical coupling of a fuel cell unit to a traction network that includes a high-voltage battery, the DC voltage converter comprising:
   a first electrical terminal pair at a fuel cell side and configured to receive a DC input voltage;
   a first full switch bridge including first switches and configured to transform the DC input voltage to a first alternating voltage;
   a second full switch bridge including second switches and connected in parallel with the first full switch bridge and including second switches configured to transform the DC input voltage into a second alternating voltage;
   a first transformer having:
     a primary side configured to receive the first alternating voltage; and
     a secondary side, wherein the first transformer is configured to transform the first alternating voltage into a first transformed alternating voltage according to a ratio of the primary side and the secondary side of the first transformer;
   a second transformer having:
     a primary side configured to receive the first alternating voltage; and
     a secondary side, wherein the second transformer is configured to transform the second alternating voltage into a second transformed alternating voltage according to a ratio of the primary side and the secondary side of the second transformer;
   a third full switch bridge electrically connected to the secondary side of the first transformer and including third switches;
   a fourth full switch bridge switched in series with the third full switch bridge, electrically connected to the secondary side of the second transformer and including fourth switches, wherein the third full switch bridge and the fourth full switch bridge are configured to collectively transform the first and second transformed alternating voltages to a DC output voltage; and a second electrical terminal pair at a battery side and configured to output the DC output voltage, wherein at least one of the first, second, third, and fourth full switch bridges is included in a resonance circuit including an inductance and a capacitor.

2. The DC voltage converter arrangement according to claim 1, wherein at least one of the secondary side of the first transformer and the secondary side of the second transformer is associated with the resonance circuit, wherein the resonance circuit is driven by a stray inductance present at at least one of the secondary side of the first transformer and the secondary side of the second transformer.

3. The DC voltage converter arrangement according to claim 2, wherein at least one of the capacitor and the stray inductance is dimensioned or configured such that a load current flowing through the third switches of the third full switch bridge or through the fourth switches of the fourth full switch bridge is reduced or minimized.

4. The DC voltage converter arrangement according to claim 3, wherein switching times of the third switches and the fourth switches are chosen such that they substantially pass none of the load current through the third switches and the fourth switches, wherein the load current is substantially sinusoidal.

5. The DC voltage converter arrangement according to claim 2, wherein the first transformer is associated with a first resonance circuit including a first capacitor and driven by a stray inductance at the secondary side of the first transformer, wherein the second transformer is associated with a second resonance circuit including a second capacitor and driven by a stray inductance at the secondary side of the second transformer.

6. The DC voltage converter arrangement according to claim 1, wherein the first electrical terminal pair is connected to an output terminal pair of a boost converter electrically connected to the fuel cell unit.

7. The DC voltage converter arrangement according to claim 6, wherein a first DC voltage is present at an input side of the boost converter and a second DC voltage level higher than the first DC voltage level is present at an output side of the boost converter, wherein, the second DC voltage level corresponds to the DC input voltage, wherein the DC output voltage is higher than the DC input voltage.

8. The DC voltage converter arrangement according to claim 6, wherein a distributor unit is electrically connected to the output terminal pair of the boost converter and electrically connected at the output side to at least one secondary consumer of a fuel cell system including the fuel cell unit.

9. A fuel cell vehicle having a fuel cell system, comprising:
a fuel cell unit; and
a DC voltage converter arrangement electrically connected to the fuel cell unit and configured to supply electricity to a traction network having at least one of a high-voltage battery and a traction motor, wherein the DC voltage converter arrangement includes:
a first full switch bridge including first switches and configured to transform the DC input voltage to a first alternating voltage;
a second full switch bridge including second switches and connected in parallel with the first full switch bridge and including second switches configured to transform the DC input voltage into a second alternating voltage;

a first transformer having:
a primary side configured to receive the first alternating voltage; and
a secondary side, wherein the first transformer is configured to transform the first alternating voltage into a first transformed alternating voltage according to a ratio of the primary side and the secondary side of the first transformer;
a second transformer having:
a primary side configured to receive the first alternating voltage; and
a secondary side, wherein the second transformer is configured to transform the second alternating voltage into a second transformed alternating voltage according to a ratio of the primary side and the secondary side of the second transformer;
a third full switch bridge electrically connected to the secondary side of the first transformer and including third switches;
a fourth full switch bridge switched in series with the third full switch bridge, electrically connected to the secondary side of the second transformer and including fourth switches, wherein the third full switch bridge and the fourth full switch bridge are configured to collectively transform the first and second transformed alternating voltages to a DC output voltage; and
a second electrical terminal pair at a battery side and configured to output the DC output voltage, wherein at least one of the first, second, third, and fourth full switch bridges is included in a resonance circuit including an inductance and a capacitor.

10. A method for operating a DC voltage converter arrangement, the method comprising:
providing a DC input voltage at a first full switch bridge including first switches and at a second full switch bridge switched in parallel with the first full switch bridge and including second switches;
transforming the DC input voltage into an alternating voltage with the first full switch bridge and the second full switch bridge;
providing the alternating voltage at a primary side of a first transformer;
transforming the alternating voltage to a first transformed voltage at a secondary side of the first transformer;
providing the alternating voltage at a primary side of a second transformer;
transforming the alternating voltage to a second transformed voltage at a secondary side of the second transformer;
transforming the first transformed alternating voltage at the secondary side of the first transformer and die second transformed alternating voltage at the secondary side of the second transformer with a third full switch bridge including third switches and a fourth full switch bridge switched in series with the third switch bridge and including fourth switches; and
operating an electrical resonance circuit including a capacitor with a stray inductance present on the secondary side of at least one of the first transformer and the second transformer such that substantially none of a substantially sinusoidal load current flows through at least one of the first switches, the third switches, and the fourth switches at a switching time.

* * * * *

UNITED STATES PATENT AND TRADEMARK OFFICE
CERTIFICATE OF CORRECTION

| | | |
|---|---|---|
| PATENT NO. | : 11,349,402 B2 | Page 1 of 1 |
| APPLICATION NO. | : 17/287970 | |
| DATED | : May 31, 2022 | |
| INVENTOR(S) | : Martin Breu et al. | |

It is certified that error appears in the above-identified patent and that said Letters Patent is hereby corrected as shown below:

In the Claims

<u>Column 8, Claim 10, Lines 54-55:</u>
"transformer and die second" should read: -- transformer and the second --.

Signed and Sealed this
Twenty-third Day of April, 2024

Katherine Kelly Vidal
*Director of the United States Patent and Trademark Office*